3,538,066
POLYMERIZATION OF VINYL CHLORIDE
Georgette Steinbach Van Gaver, Paris, and Jean Claude Thomas and Michel Marbach, Lyon, France, assignors to Produits Chimiques Pechiney-Saint-Gobain, Paris, France
No Drawing. Filed Feb. 13, 1967, Ser. No. 615,334
Claims priority, application France, Feb. 23, 1966, 50,767
Int. Cl. C08f 3/30, 15/08
U.S. Cl. 260—85.5                                 4 Claims

ABSTRACT OF THE DISCLOSURE

Vinyl chloride is polymerized in mass in the presence of alpha-halogeno-lauroyl peroxide at temperatures between $-5°$ C. and $+35°$ C.

---

This invention relates to the polymerization of vinylic monomers. As vinyl chloride is of great importance and as this invention is particularly valuable in its polymerization, the invention will be described in that application. The invention is particularly effective as applied to polymerization in mass, that is in the absence of solvents and diluents for the monomer.

It has already been proposed to use lauroyl peroxide for the polymerization of vinylic monomers in mass but the valuable zone of activity of that initiator is within the limits of about 50°–60° C., which is also true of most known initiators. As a consequence, it has permitted only the formation of polymers and copolymers of standard type having moderate molecular masses and such properties as permit its use in classical techniques. Vinyl chloride is a gas at ordinary temperature, is polymerized in mass under pressure at which it is liquid, and attempts have been made to reduce the pressure required by polymerization at relatively low temperatures, for instance below 20° C. A particular advantage of low temperature polymerization is the production of products of higher molecular mass, better bending temperature, better resistance to traction, higher thermal stability, and inertia toward solvents.

The objects of this invention are to produce polymers of vinyl chloride, within which term we include copolymers, at low temperature, of relatively high molecular mass, and with properties better than those produced by classic processes of higher temperature and other catalysis.

The objects of the invention are accomplished generally speaking by a method of polymerizing vinyl chloride in mass which comprises subjecting vinyl chloride to conditions of temperature, pressure, and agitation favorable to polymerization, in contact with a compound of the formula

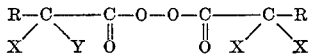

in which X and Y are one of the group consisting of halogen and hydrogen and at least one of the two substituents X and Y is halogen, and R is saturated aliphatic of 10 C atoms. The halogens commonly used are chlorine, bromine and iodine, chlorine being usually selected because of its low cost and high efficiency. R may carry the usual substituents, which do not alter the basic characteristic of the radical, such as halogen, particularly chlorine. The process goes well between $-15°$ C. and $+35°$ C. in an autoclave under pressure which liquefies vinyl chloride at the temperature selected.

Among the unsaturated ethylenic monomers which can be satisfactorily copolymerized with vinyl chloride under these conditions are vinyl acetate, vinyl laurate, vinyl stearate, dichloroethylene 1,1 and 1,2 trichlorethylene, monochlorotrifluoroethylene, acrylonitrile, propenyl chloride, and chloroprene.

Among the alpha-halogenolauroyl peroxides which have been used to initiate the reactions are alpha-chlorolauroyl peroxide with or without halogen substituents in other parts of the chain. These catalysts may be used singly or in mixtures. When used in mixtures the different catalysts may be added simultaneously or separately at different stages of the process of operation. They may be used very effectively in catalytic systems, frequently called Redox systems, which involve the association of a peroxide and a reducing agent effective in the polymerization of such ethylenic monomers.

The new catalysts are advantageously employed in proportions, expressed in active oxygen provided by the peroxide, of .001% to .012% by weight of the monomeric compositions to be polymerized. They are generally employed in proportions producing from about .004 to about .008% of active oxygen.

It has been observed that the new initiators are generally very active but that to obtain optimum operating conditions one selects preferential ranges of temperature according to the nature, the number and the position of the halogen substituents as they appear in the molecule of the particular catalyst chosen.

This improvement in polymerization in mass is equally applicable to the different techniques which have been developed and which are represented by French Pats. 1,079,772; 1,257,780; 1,357,736; and 1,382,072 and their additions, a representative list illustrating the general applicability of the new catalyst to polymerization systems.

An advantage of the present invention is the production at low temperature of products having higher molecular weight and better qualities than polymers and copolymers presently produced at temperatures of 50° C. and above, the bending temperature, resistance to traction, thermal stability, and inertia toward solvents being particularly improved.

The following examples illustrate the use of the invention, without limiting its generality, for the polymerization in mass of vinyl chloride and representative comonomers in contact with novel initiators, alone and mixed with other catalysts.

EXAMPLE 1

A vertical autoclave of stainless steel of 10. 1. capacity, provided with a low speed agitator of anchor type, a thermometer tube, a manometer, and valves for the introduction of gases, having a liquid jacket through which the cooling or heating liquid could be circulated at will, was closed, purged with nitrogen and charged with 3850 g. of vinyl chloride, of which 350 g. were released to purge the autoclacve. 27.6 g. of a solution, in petroleum ether and monofluorotrichloromethane, of alpha-chlorolauroyl peroxide was injected and provided .008 g. of active oxygen per 100 g. of vinyl chloride. The polymerization was carried out at 10° C. for 6 hours with agitation at 100 r.p.m. The unreacted monomer was vented. After drying at 50° C. the product was 470 g. of polyvinyl chloride powder, a global yield of 13.4%, an average hourly yield of 2.24%. The index of viscosity by Afnor test (NF) T 51–013 at 20° C. in cyclohexanone at .5% was 470. The Vicat point measured under a weight of 5 kg. was 86° C. The test was applied to test pieces of the polymer mixed with dibutyltin thioester as a stabilizer and shaped under pressure. This product was superior to known products produced at temperatures upward of 50° C.

EXAMPLE 2

Under conditions similar to those of Example 1, the temperature of the reaction medium being maintained at 17° C. instead of 10° C., produced 1470 g. of polymer after 6 hours, the global yield being 42%. The index of viscosity was 388, and the Vicat point was 83° C.

EXAMPLE 3

Several polymerization operations were carried out in the manner described in Example 1, the temperature of the medium being maintained at 15° C. for 6 hours. The catalysts were introduced in various solvent media containing about 29% of alpha-chlorolauroyl peroxide to provide .008 g. of active oxygen for each 100 g. of monomer. The nature of the inert solvent did not affect the progress of the polymerization nor the properties of the powdery product produced. The results of these tests are shown in the table:

| Tests | 1 | 2 | 3 |
|---|---|---|---|
| Solvent for the peroxide | (1) | (2) | (3) |
| Yield, percent | 38 | 42 | 41 |
| Hourly yield, percent | 6.3 | 7 | 6.8 |
| Afnor viscosity | 421 | 426 | 408 |
| Vicat point, °C | 83.5 | 83 | 83 |

[1] Trifluorotrichlorethane+petroleum ether.
[2] Trifluorotrichlorethane.
[3] Petroleum ether.

EXAMPLE 4

Copolymerization was carried out under conditions similar to those applied in the first test of Example 3, the autoclave having been purged with 3150 g. of vinyl chloride and 350 g. of vinyl acetate, a composition by weight of 90/10. After 8 hours of copolymerization and venting of the unpolymerized portion, the global yield was 32% at an hourly rate of 4%. The composition of the copolymer was 95.5/4.5 as determined by chlorine analysis. The Afnor viscosity index was 190.

EXAMPLE 5

In this example the alpha-chlorolauroyl peroxide was employed with a co-catalyst, triethylboron hydrazine, for the polymerization of vinyl chloride in mass at a temperature of —12° C. The autoclave of Example 1 was employed. The apparatus was charged with 300 g. of methanol and 3300 g. of vinyl chloride. 300 g. of monomer were discharged to scavenge the autoclave and a stirrer was rotated at 160 r.p.m. The temperature of the autoclave was reduced to —20° C. by circulation of a cooling fluid. This cooling produced a reduction of pressure. 195 cc. of oxygen were introduced, providing 0.0093 g. molecular oxygen for each 100 g. of monomer. Agitation continued for 5 minutes and 13.2 cc. of a solution, at 0° C., of alpha-chlorolauroyl peroxide were added, providing 1.2 of active oxygen for each 100 cc. There were thus introduced into the autoclave .159 g. of active oxygen, or .0053 g. of active oxygen for each 100 g. of monomer. After 1 minute of agitation 4.6 cc. of triethylboron hydrazine were added, providing .13 g. per 100 g. of monomer. This autoclave thus contained a Redox system fortified by molecular oxygen. The reaction medium was brought to —12° C. with agitation at 160 r.p.m. Polymerization continued for 1 hour after which the agitator was reduced to 50 r.p.m. The manometer pressure was 80 g. The operation was stopped after 10 hours of polymerization and 1500 g. of polymer (dry weight) were recovered, a 50% yield at an average hourly yield of 5%. The polymer had an Afnor index of viscosity of 450 and a Vicat point of 90° C.

This invention has, as notable achievements, the production at low temperature of polymers superior to those which were previously produced at temperatures upward of 50° C., including higher molecular weight. Other advantages are in the achievement of the objects of the invention.

As many apparently widely different embodiments of the present invention may be made without departing from the spirit and scope thereof, it is to be understood that the invention is not limited to the specific embodiments.

What is claimed is:

1. A method of polymerizing vinyl chloride which comprises subjecting a monomer composition comprising preponderantly vinyl chloride to agitation and polymerization in contact with an alpha-halogeno-acyl peroxide of the formula

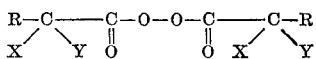

in which X represents halogen, and Y is selected from the group consisting of halogen and hydrogen, and R is a saturated aliphatic radical of 10 C atoms, at a temperature between about —15° C. and +35° C. at a pressure at which the vinyl chloride is liquid and in mass, said alpha-halogeno-acyl peroxide being present in an amount sufficient to provide active oxygen to the polymerization in amounts of from 0.001% to 0.012% by weight of the monomeric composition.

2. A method according to claim 1 in which the alpha-halogeno-acyl peroxide is alpha-chlorolauroyl peroxide.

3. A method according to claim 1 in which the said monomeric composition includes another monomer selected from the group consisting of vinyl acetate, vinyl laurate, vinyl stearate, 1,1 dichloroethylene, trichloroethylene, monochlorotrifluoroethylene, 1,2 dichloroethylene, acrylonitrile, propenyl chloride and chloroprene.

4. A method according to claim 1 in which the alpha-halogeno-acyl peroxide is used in amount to provide from 0.004% to 0.008% by weight of active oxygen based on the weight of monomer.

References Cited

UNITED STATES PATENTS

| | | | |
|---|---|---|---|
| 2,559,630 | 7/1951 | Bullitt | 260—610 |
| 2,792,423 | 5/1957 | Young et al. | 260—610 |
| 3,089,865 | 5/1963 | Walther et al. | 260—92.8 |
| 3,169,947 | 2/1965 | Stroh et al. | |

OTHER REFERENCES

Steinbach et al., Chem. Abs. 60 (1964), p. 13341d.
Sianesi et al., Chem. Abs. 62, (1965), p. 66d.

HARRY WONG, JR., Primary Examiner

U.S. Cl. X.R.
260—87.1, 87.5, 92.8